(No Model.) 2 Sheets—Sheet 1.

C. A. McDONALD & C. W. TOWNSEND.
DAMPER REGULATOR FOR STEAM BOILERS.

No. 334,600. Patented Jan. 19, 1886.

WITNESSES:

INVENTOR:
C. A. McDonald
C. W. Townsend
BY Munn & Co
ATTORNEYS.

(No Model.) 2 Sheets—Sheet 2.

C. A. McDONALD & C. W. TOWNSEND.
DAMPER REGULATOR FOR STEAM BOILERS.

No. 334,600. Patented Jan. 19, 1886.

WITNESSES:
John N. Deemer
C. Sedgwick

INVENTOR:
C. A. McDonald
C. W. Townsend
BY Munn & Co.
ATTORNEYS.

UNITED STATES PATENT OFFICE.

CHARLES A. McDONALD AND CHARLES W. TOWNSEND, OF PORTLAND, OREGON; SAID McDONALD ASSIGNOR OF ONE-HALF HIS RIGHT TO SAID TOWNSEND.

DAMPER-REGULATOR FOR STEAM-BOILERS.

SPECIFICATION forming part of Letters Patent No. 334,600, dated January 19, 1886.

Application filed July 8, 1885. Serial No. 171,021. (No model.)

*To all whom it may concern:*

Be it known that we, CHARLES A. McDONALD and CHARLES W. TOWNSEND, of Portland, in the county of Multnomah and State of Oregon, have invented a new and useful Improvement in Damper-Regulators for Steam-Boilers and for other Purposes, of which the following is a full, clear, and exact description.

This invention is applicable to a variety of purposes in which a damper or valve is used to control the pressure of vapors, gases, or fluids, including the pressure of steam in locomotive-engine and other steam-boilers, the working pressure of reducing-valves in steam, water, and other pipes, and for controlling the throttle-valves of pumps, air-compressors, &c., the invention being equally applicable to apparatus using steam, air, gas, or water under pressure, and when applied to steam-boilers it may be used to control the damper, whether arranged in the smoke-stack or ash-pan of the boiler. It will suffice here, however, to describe the invention as applied to controlling the damper or dampers in the ash-pan of locomotive steam-boilers.

The invention consists in novel means whereby a positive action or direct pressure of the working vapor, gas, or fluid is used to close the damper or valve controlling the pressure, as against a spring or weight for opening the valve when relieved of pressure, and also in means for providing for the escape of the vapor, gas, or fluid after it has performed its duty on the damper or valve which controls the pressure, and for draining the connections of fluid or condensed vapor; likewise in means for communicating motion to the damper or like valve, all substantially as hereinafter described and claimed.

Reference is to be had to the accompanying drawings, forming a part of this specification, in which similar letters of reference indicate corresponding parts in all the figures.

Figure 1:
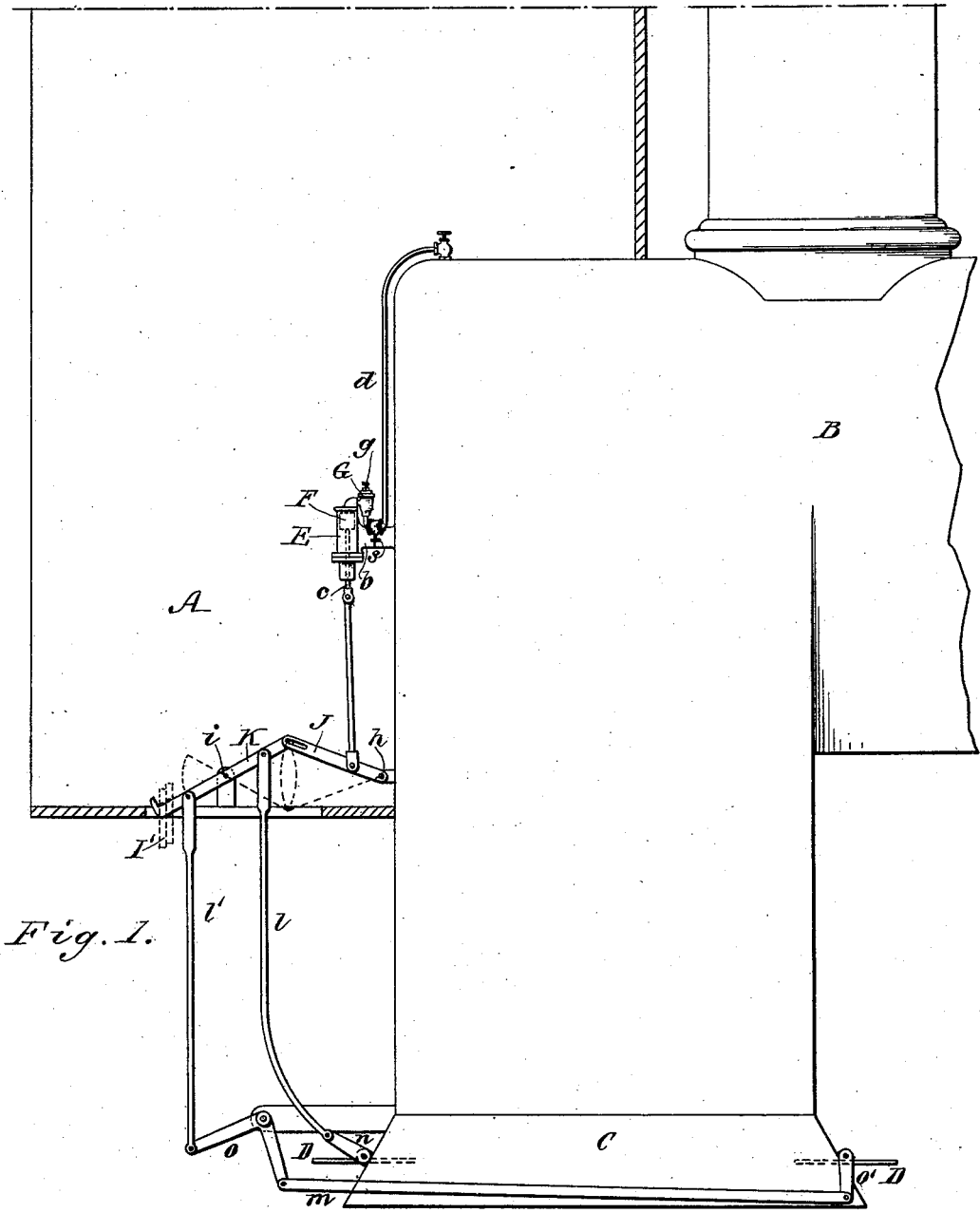
Figure 2:
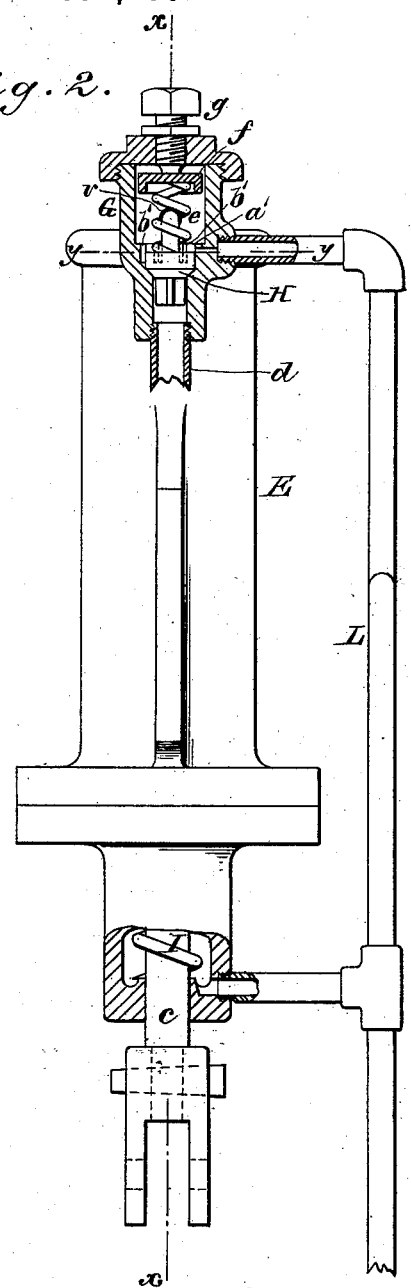
Figure 3:
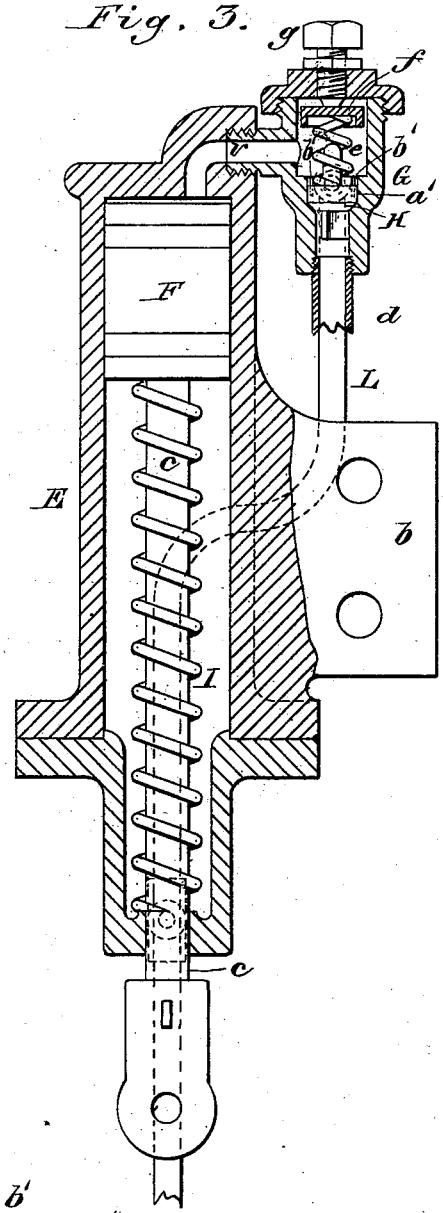
Figure 4:
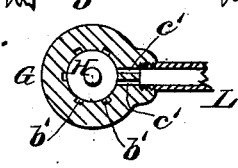

Figure 1 represents a partially-sectional longitudinal elevation of a locomotive-engine boiler and cab of the engine, in part, with our invention applied. Fig. 2 is a partially-sectional elevation, upon a larger scale, of the pressure-valve with attachments for controlling the damper or dampers of the boiler-furnace; Fig. 3, a mainly vertical section of the same on the line $x\ x$ in Fig. 2, and Fig. 4 a transverse section on the line $y\ y$ in Fig. 2.

A indicates the cab of the engine; B, its boiler, and C the ash-pan of the furnace of the boiler, fitted or provided with the usual front and rear dampers, D D.

Attached, as by a foot or bracket, $b$, to the boiler is a cylinder, E, here shown as arranged to occupy an upright position. Within said cylinder is a piston, F, made with or without packing, and fitted with a rod, $c$, which passes out through the lower end of the cylinder or cap thereon to connect with the mechanism by which the dampers are controlled. Screwed into a lug on the upper end of the cylinder E is a valve-case, G, within which is arranged a pressure-valve, H, that controls the movement at the piston F to close the dampers D D as against a spring, I, applied to the piston, or a weight, I', the equivalent of the spring, applied to the levers or mechanism connecting the piston-rod with the dampers to lift the piston and open the dampers when the piston is relieved of steam-pressure.

Steam is admitted from the boiler by a pipe, $d$, to the valve-case G beneath the valve H, that is or may be a puppet one, and is held down to its seat by a spring, $e$, resting in a follower, $f$, which is controlled by a screw, $g$, to open at any extreme pressure that the boiler is designed to carry. When the steam in the boiler reaches its extreme point, said valve H is raised and steam is allowed to pass it, and through a passage, $v$, to act upon the top of the piston F, to force it down and close the damper or dampers D by the connection of the piston-rod $c$ with a slotted lever, J, having its fulcrum at $h$, and engaging by a pin with another lever, K, having its fulcrum at $i$, and rods $l\ l'\ m$ and cranks $n\ o\ o'$ connecting said rods with the dampers.

It will be obvious that any other system of rod-and-lever connections may be used and the position of the cylinder E be changed according to the distance of the damper-cranks or levers from the boiler and other circumstances.

Applied to a locomotive-boiler, it is preferred to arrange the cylinder E and the several levers and connections with the dampers on the left side of the cab, and close to the fireman's seat, out of the way of other parts of the boiler. When the pressure-valve H is used to control a damper in the smoke-stack, or when it is used for other purposes than controlling the damper of a steam-boiler furnace, the mere arrangements of the parts will necessarily have to be different; but the operation is necessarily the same in every case.

When the steam in the boiler drops one or more pounds below its required extreme pressure, the spring $e$ will seat the valve H to shut off the supply of steam to the top of the piston F. When this takes place, means must also be provided for freeing the cylinder E and valve-case G of the steam with which they were charged, in order that the piston F may be raised by its lifting spring or weight to open the dampers. This may be done in various ways. Thus it might be done by establishing a slow leakage past the piston F throughout the length of the cylinder E, and connecting said cylinder top and bottom by an exhaust and drain pipe, L, fitted with a cock at top, to regulate the return of the piston F when the valve H is closed, and a cock, $s$, may be attached to the lower portion of the steam-supply pipe $d$, to run off water of condensation collecting in said pipe. It is preferred, however, to make the pressure-valve, or "pressure-regulating valve," H, as it may be termed, automatic as regards exhaust of the steam from the cylinder E and valve-case G, when said valve closes by reduction of pressure of the steam in the boiler, in order that the piston F may be raised by its lifting spring or weight and the damper or dampers be opened. To this end the valve H is constructed cylindrical at its top, and tapering to fit the valve-seat at its bottom. This upper cylindrical portion of the valve fits, as a piston, a corresponding cylindrical chamber, $a'$, in the valve-case G. Said chamber, which communicates at its top with the upper enlarged or main portion of the valve-case, has a series of grooves, $b'$, extending downward from its top, but stopping short of the valve-seat. These grooves connect above with the main portion of the valve-case, and the chamber $a'$ connects at a point above the valve H, when seated, by one or more side apertures, $c'$, with the exhaust and drain pipe L of the cylinder and valve-case. This provides, when the valve H is closed, for the escape of any steam or water in the upper portion of the cylinder E and valve-case G through the apertures $c'$ to the exhaust-steam and drain pipe L, which also connects with the lower end of the cylinder for draining purposes. The cylinder E and valve-case G being thus relieved of steam or water and valve H closed by its spring against the further supply of steam to said cylinder, the piston F is free to rise, under the impulse of its lifting spring or weight, to open the furnace damper or dampers. When, however, the steam-pressure again gets excessive in the boiler, the valve H will be raised sufficiently to close the outlets $c'$ and to open or expose the grooves $b'$ for the passage of the steam through the valve-case to the top of the piston F, which will then be again depressed to close the dampers.

By making the regulator to close the damper or valve to be controlled in a positive and direct manner, as described, by the pressure of the steam or other vapor, gas, or fluid acting upon the piston of the regulator—so necessary when the pressure or supply is excessive—said damper or valve will require no weights to assist it in closing, and which are liable to fail in closing the damper.

Having thus described our invention, we claim as new and desire to secure by Letters Patent—

1. In damper and other valve regulators for steam-boilers and other purposes, the combination, with the damper or valve to be controlled, and with the regulator-cylinder, its piston, and mechanism, substantially as described, connecting said piston with said damper or valve, of a valve-case, a loaded pressure-valve therein, pipes or connections for supplying steam or other vapor, gas, or fluid under pressure to the face side of the pressure-valve, and after passage through such valve to the piston of the regulator, an exhaust and drain pipe from the regulator, and a spring or weight applied to return the piston to its normal position after it has been relieved of pressure, the whole being organized to close the damper or valve to be controlled by the pressure of the vapor, gas, or fluid brought to bear upon the piston, as herein set forth.

2. The combination, with the damper or valve to be controlled, of the cylinder E of the regulator, the piston F, the valve-case G, the pipes or connections $d\ v$, the adjustable pressure-valve H, the exhaust and drain pipe L, levers and rods connecting the piston with the damper or valve to be controlled, and a spring or weight applied to return the piston after the same has been relieved of the pressure used to operate it in closing the damper or valve to be controlled, essentially as described.

3. The pressure-valve H of the regulator, constructed to act as a piston, and having a controlling-spring, $e$, in combination with the valve-case G, having a cylindrical chamber, $a'$, grooves $b'$, and one or more outlet-apertures, $c'$, the pipes or connections $d\ v$, the cylinder E, with its piston F, having its return action controlled by a weight or spring, as described, and the exhaust and drain pipe L, substantially as specified.

4. The combination, with a steam-boiler, of the steam-supply pipe $d$, the valve-case G, with its adjustable pressure-valve H, the connection $v$, the cylinder E, with its piston F, having its return action controlled by a spring or weight, as described, one or more dampers, D, connected by rods and levers with the piston, and means, substantially as described, for relieving the cylinder and valve-case of vapor or fluid used to actuate the piston in closing the damper, essentially as herein set forth.

CHARLES A. McDONALD.
CHARLES W. TOWNSEND.

Witnesses:
J. R. STODDARD,
HENRY HAYNES.